April 7, 1931. E. PEETS 1,799,699
TREE SURGERY
Filed Sept. 19, 1927
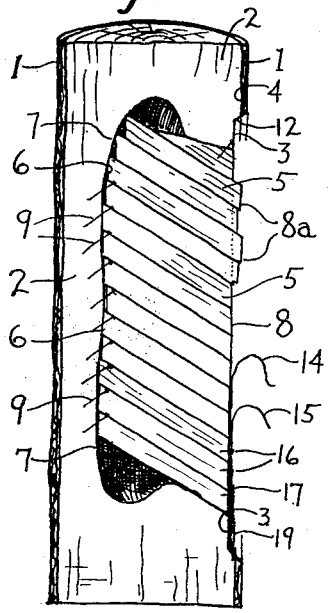
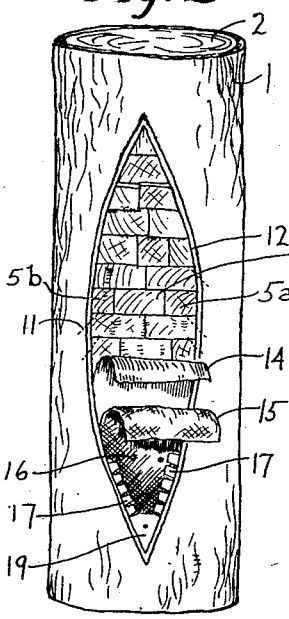
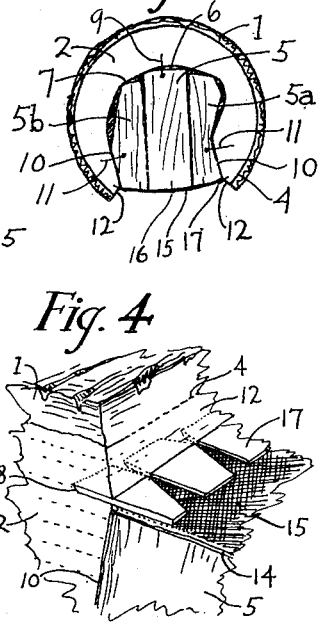
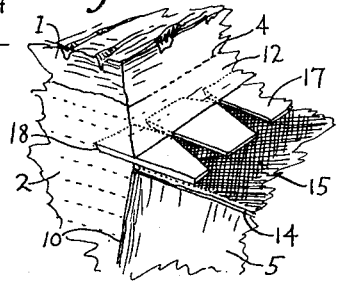
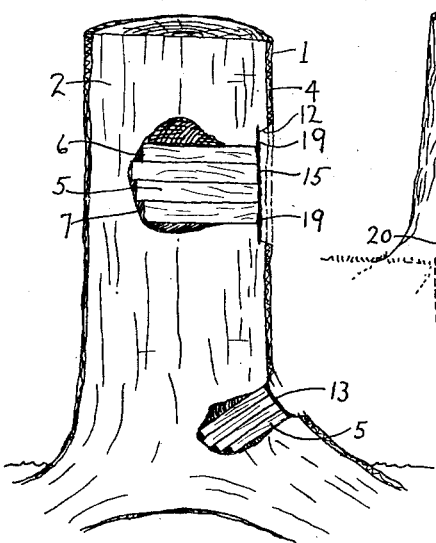
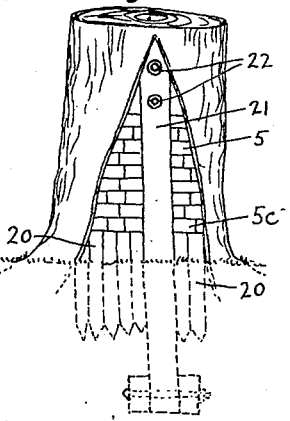
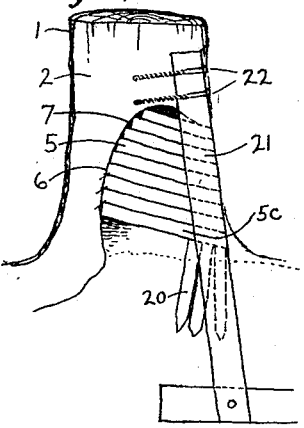
INVENTOR.
Elbert Peets Patented Apr. 7, 1931

1,799,699

UNITED STATES PATENT OFFICE

ELBERT PEETS, OF CLEVELAND, OHIO

TREE SURGERY

Application filed September 19, 1927. Serial No. 220,402.

The object of this invention is to fill cavities in trees with pieces of wood so arranged that they will form a strong surface over which the healing callus may grow, the filling being economical of installation and impervious to damage by the warping or shrinking of its component members. A secondary object is a wood filling which will permit the circulation of air through itself and thereby make possible the natural seasoning of the wood exposed by the excavation of the cavity. These objects are attained by filling the cavity mainly with pieces of wood set transversely to the longitudinal grain of the tree, their head ends lying in the external face of the filling.

In the drawing Figure 1 is a vertical section through a tree containing a filling, the surface treatment being shown incomplete; Fig. 2 is a front view of a similar filling, also with surface treatment complete at the lower part and incomplete above; Fig. 3 is a horizontal section through a filled tree; Fig. 4 is a sectional view of the edge of a filling; Fig. 5 is a vertical section through two narrow but deep cavities; Fig. 6 is a front view of a basal cavity with a timber brace; and Fig. 7 is a vertical section through the same.

The decayed wood in the cavity is excavated in the usual way. The points of the cavity are cut sharp to encourage callus growth, the bark 1 and the wood 2 being cut away to form a triangular surface 3 a short distance below the cambium 4. The filler units 5, of wood or similar fibrous material, are laid into the cavity with their butt ends 6 resting against the rear wall 7 of the cavity, and the head ends 8 and 8a forming the surface which closes the cavity mouth. The filler units 5 are usually laid at an ascending angle, rising from the front to the rear of the cavity. This is in order to shed water, to facilitate fixing by nails 9 to the wood 2, and to facilitate trimming back the rough surface formed by the head ends 8a of the filler units as first laid in.

As each course of the filler units 5 is laid in, the side units 5a and 5b coming into contact with the side wall 10 of the cavity are shaped roughly to fit said wall, as shown in Fig. 3. By this means these side filler units are keyed or locked into the cavity, and they may be further secured by nails 11. After the filler units are all in place their projecting head ends 8a are trimmed down to a surface 8 conforming at its edges approximately to the line of junction between a bevel surface 12 (previously formed around the mouth of the cavity) and the cavity side wall 10. The smoothed filling surface 8 is also continuous with the triangular surfaces 3, 3 at the top and bottom of the cavity mouth.

The filler units 5 which do not come into contact with the side walls 10 do not usually need shaping, but sometimes a course of filler units can be securely locked into place by cutting one or more central filler units longitudinally to a wedge shape.

When the smoothed filling surface 8 is completed the filling is ready for its surface treatment. If the cavity is a small one and the work has been done with care it is possible to leave the smoothed surface 8 of the filling without other treatment than a coat of creosote. But usually it is better to use a special surface treatment to cover the small openings between the filler units. A thin coating of plastic waterproof cement 13, shown in the lower cavity in Fig. 5, can be used as a surface covering if the interior of the cavity is quite dry. But in most cases it is necessary to provide for the circulation of air through the filling in order to permit the evaporation of moisture and the natural seasoning of the interior walls of the cavity. To accomplish this a porous covering over the surface of the filling is necessary. For this purpose I have used closely woven copper fabric, tacked to the surface, but a more effective treatment, intended to keep out water, insects, and fungus spores, while permitting the passage of air, is shown in the drawing. Cloth or canvas 14, impregnated with a disinfecting and waterproofing material, as creosote, is spread over the smoothed surface 8. Over the cloth 14 is spread metal fabric 15 fixed to the surface of the filling by tacks 16. The next step is the flashing of the edges of the metal fabric in order to prevent the healing callus from pushing under them. This is done by metal flashing plates or nails 17 which are laid against the edge portion of the metal fabric 15 and driven into the wood of the tree at the foot of the bevel surface 12. These flashing plates, as shown in Fig. 4, are sharpened like a chisel, one edge 18 being beveled. When the flashing plate is driven into the wood the beveled edge 18 tends to rise in the wood, which causes the exposed or head portion to press firmly against the metal fabric 15. At the top and bottom of the filling triangular metal plates or point units 19 are used instead of the flashing plates and are driven a short distance into the wood.

The cavities in trees occur in such diverse forms that no filling technique can be applied to all cavities without modification. The method I use is easily adaptable to these vibrations. If, for instance, the cavity is deep but with a small mouth, as in Fig. 5, it is more convenient to insert the filler units 5 at approximately right angles with the surface of the filling. This and similar modifications will not endanger the success of the filling provided that substantially all the filler units which close the mouth of the cavity are laid with their head ends at the surface of the filling and their longitudinal grain running rearwards therefrom. In such a position the inevitable warping, shrinking, and expanding of the filler units cannot dislodge them nor produce any serious distortion of the external surface of the filling.

When a cavity is at the base of a tree, as in Figs. 6 and 7, the lowest course 5c of filler units is supported by approximately vertical stakes 20. If the tree needs strengthening a heavy timber brace 21 can be used. The upper end of the brace is set with bolts 22 into a coffer cut into the solid wood above the cavity. Filler units 5 are used to fill the opening between the brace and the sides of the cavity mouth. For greater clearness in the drawing the final surface treatment, which is shown partially installed in Figs. 1 and 2, is omitted from Figs. 6 and 7.

It is possible, by the free use of bolts and nails, to make a wood filling into a practically solid mass, and most methods of filling cavities with wood aim at that result. I do not try, however, to make my wood fillings solid, because mere solidity of the filling does not strengthen the tree unless the filling is attached to the tree as strongly as by the fibrous connection of natural growth, a degree of strength which cannot be secured by practicable mechanical means. My filler units are fixed and locked into place with a minimum number of nails, in order to preserve a slight freedom of movement throughout the filling. No nails are needed to prevent the filler units from warping because such warping as may occur cannot do serious damage to this type of filling. Nor is it necessary to use large quantities of plastic cement between the filler units, as is done in other systems of filling trees with wood. Water is kept out of my fillings by the slope of the filler units and by the surface treatment. The cracks between the units are left open in order to form small passages for the circulation of air through the filling.

This application is a continuation in part of my application Serial No. 43,716, filed July 15, 1925. Attention is also called to my copending application Serial No. 222,377, filed Sept. 27, 1927.

I claim:

1. A cavity filling comprising longitudinally fibrous units laid in the cavity with their longitudinal dimension at an angle ascending rearwards from the mouth of the cavity, the butt ends of the units resting against the wall of the cavity and the head ends being at the external surface of the filling.

2. A tree cavity filling composed predominantly of wood units laid in the cavity with their longitudinal grain at an angle ascending rearwards from the mouth of the cavity.

3. A tree cavity closure comprising, in combination, a cavity filling predominantly of wood units in courses lying at an angle ascending rearwards from the mouth of the cavity, a fabric cover applied externally to the filling, and flashing plates fixed to the tree and overlapping the cover.

4. In tree surgery, a filling cover comprising, in combination, a fabric fixed to the surface of the filling and external flashing plates covering a relatively narrow edge zone of the fabric and fixed to the tree at one edge of the cavity.

5. The method of tree surgery which consists in applying to an exposed wood surface a cover comprising an inner pad of fibrous material and an outer armor of metal fabric and in applying a flashing of rigid plates over an edge zone of the cover.

6. A tree cavity closure comprising, in combination, a filling of fibrous units, a filling cover, and flashing plates applied over an edge zone of the cover.

7. For a tree cavity filling having a surface cover, a flashing comprising plates applied over an external circumferential edge zone of the cover.

8. In tree surgery, a flashing comprising a plurality of units applied externally to an edge zone of the cavity cover, circumferentially of the mouth of the cavity.

9. In tree surgery, a flashing comprising side units and a point unit, a plurality of side units being applied in substantially contiguous sequence along a relatively narrow lateral edge zone of the cavity closure and being fixed to the tree at the adjacent side of the cavity, and a point unit being applied over an end area of said closure and fixed to two sides of the cavity at their conjunction.

In testimony whereof I affix my signature.

ELBERT PEETS.